Figure 1:
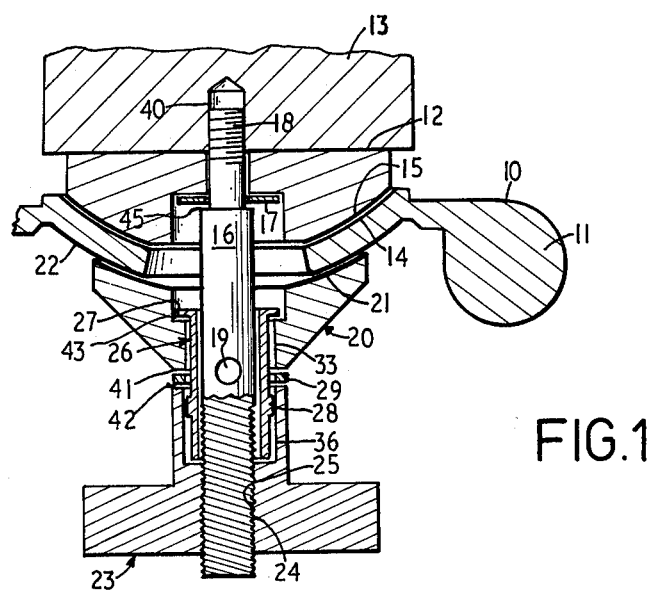

United States Patent [19]

Miller et al.

[11] 4,108,412
[45] Aug. 22, 1978

[54] CLAMP FOR TRIPOD DEVICE

[75] Inventors: Robert Eric Miller, Vaucluse; Stanley Bishop Jackson, Harbord, both of Australia

[73] Assignee: Universal Fluid Heads (Aust.) Pty. Limited, Ruschcutters Bay, Australia

[21] Appl. No.: 821,961

[22] Filed: Aug. 4, 1977

[30] Foreign Application Priority Data

Aug. 11, 1976 [AU] Australia ............................ 6957/76

[51] Int. Cl.² ............................................ F16M 11/14
[52] U.S. Cl. ..................................... 248/181; 248/187
[58] Field of Search ............... 248/177, 178, 179, 180, 248/181, 182, 187

[56] References Cited

U.S. PATENT DOCUMENTS 3,592,429  7/1971  Miller et al. ........................ 248/179
3,881,675  5/1975  Matchett ............................. 248/178
4,019,710  4/1977  O'Connor et al. ................... 248/181

FOREIGN PATENT DOCUMENTS 289,091  6/1953  Switzerland ........................... 248/180
285,112  2/1928  United Kingdom .................... 248/181

Primary Examiner—Robert A. Hafer
Attorney, Agent, or Firm—Ladas, Parry, Von Gehr, Goldsmith & Deschamps

[57] ABSTRACT

A clamping component for a camera tripod top, said component comprising:- a clamping member, handle means for locking the component to said top, and means connected to and between said clamping member and said handle means permitting relative rotational movement there between, said handle means being adapted for threaded engagement with means connected to an opposing clamping member.

5 Claims, 2 Drawing Figures

U.S. Patent  Aug. 22, 1978  4,108,412

CLAMP FOR TRIPOD DEVICE

The present invention relates to tripods for cameras and more particularly, but not exclusively, to a clamping assembly for a ball levelling tripod top.

In one conventional tripod, the legs of the tripod are pivotally attached to a body member or tripod leg mounting and a tripod platform is in turn attached to the body member. In order to permit levelling of the platform, the underside of the platform is hemispherical in shape and locates in a correspondingly hemispherical socket in the upper portion of the tripod leg mounting. The platform is secured in position by means of a clamp which bears on the underside surface of the tripod leg mounting. A clamp wing nut or hand wheel is provided to release or lock the clamp. To detach the platform from the tripod leg mounting, the clamp wing nut is removed and the clamp and its associated thrust washers come away under their own weight. In use the clamp and associated washers are often dropped during dismantling of the tripod and thus the conventional clamping device is inconvenient to use.

It is an object of the present invention to provide a clamping device which is substantially free of the above disadvantages.

The present invention in one general form is a clamping component for a camera tripod top, said component comprising: a clamping member, handle means for locking the component to said top, and means connected to and between said clamping member and said handle means permitting relative rotational movememt therebetween, said handle means being adapted for threaded engagement with means connected to an opposing clamping member.

Some preferred embodiments of the present invention will now be described by way of example with reference to the accompanying drawings, in which:-

Figure 2:
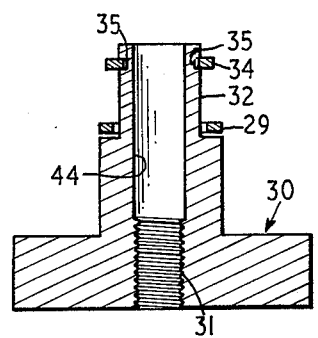

FIG. 1 is a sectional arrangement of a ball levelling tripod top, illustrating one form of clamping device, and FIG. 2 is a cross-sectional view of an alternative clamp wing nut or hand wheel.

In FIG. 1 there is shown a ball levelling tripod top to which at least three legs (not shown) are pivotally attached. The tripod top includes a body member 10 having on its upper side a hemispherical socket or a substantially concave surface 14 and on its under side a hemispherical convex surface 22. The body member 10 is provided with mounting brackets 11 to which each tripod leg is pivotally connected. A mounting platform 12, having a mating hemispherical convex under-surface or ball-seating 15, locates in socket 14 of the body member 10. Preferably a camera tilt and panning head 13 is secured to platform 12 by means of clamp bolt 16 which is provided with a threaded portion 18 on a reduced diameter section of the bolt. The threaded portion 18 of the bolt is screwed into a mating threaded bore 40 in the base of the tilt and panning head 13 to bring shoulder 45 of the bolt into contact with washer 17 and to attach the platform securely to the base of head 13. Tightening of screw 18 in bore 40 is achieved by use of a bar or the like placed in eye 19 which is formed in the shank of the bolt.

Platform 12 and the tilt and panning head attached thereto may be tilted in any transverse direction to level the platform in its body member 10. Once the platform is level it is locked into position by clamping member 20 and hand wheel or wing nut 23. The hand wheel 23 is formed with a female threaded portion 24 which engages a mating male threaded portion 25 formed on clamp bolt 16 at an end thereof remote from the tilt and panning head 13. Clamping member 20 is annular in configuration having a hemispherical concave clamping face 21, which is located adjacent to and mates with surface 22 on the under-side of the tripod body member 10, a flat radial surface 41, and a bore 33 between surfaces 22 and 41 of the clamping member. A thrust washer 29 of fibre or any other suitable material is located about bolt 16 and between surface 41 of clamping member 20 and contact surface 42 of hand wheel 23. Accordingly, by screwing hand wheel 23 on bolt 16 towards the tilt and panning head 13, body member 10 is gripped between platform 12 and clamping member 20 to lock the assembly.

The clamping member 20 and hand wheel 23 are rotatably connected together by tubular sleeve 26. One end of the sleeve is provided with a retaining flange 27, which locates in recess 43 in clamping member 20. The other end of the sleeve is secured in bore or socket 36 in hand wheel 23.

Sleeve 26 may be formed in a number of ways. The sleeve can be fabricated of aluminium and knurled along that portion 28 of the sleeve which locates in bore 44. Thus to assemble the clamp hand wheel 23 and clamping member 20, sleeve 26 is placed in bore 33 of member 20, washer 29 is then located on the exposed portion of sleeve 26 and knurled portion 28 of the sleeve 26 is finally pressed into socket 36 in hand wheel 23. To assist retention of the sleeve 26 in socket 36 an anaerobic resin adhesive may be applied to the knurled sleeve prior to the pressing operation.

A simpler method of construction would be to fasten an aluminium tube with adhesive direct into socket 36. The protuberant part of the tube may then be passed through washer 29 and bore 33 and the end of the tube subsequently deformed to form retaining flange 27. Further the sleeve may be first fabricated in plastics material and subsequently affixed with a suitable adhesive onto socket 36. The sleeve does not require any great mechanical strength but only sufficient to rotatably hold hand wheel 23 and clamping member 20 together.

In yet another alternative the sleeve 26 may be integrally formed with the hand wheel as illustrated in FIG. 2. To permit assembly of the hand wheel 30 and clamp member 20, the retention flange 27 of FIG. 1 is replaced by a split ring 34 and groove 35 in the upper end part of spigot 32. Bore 44 is sized to receive bolt 16 with a clearance fit, the bore terminating in threaded portion 31 which is sized to engage mating threaded portion 25 on the bolt.

What we claim is:

1. Apparatus for clamping a camera tripod top to a mounting platform for a camera head, said tripod top having a body member with an upper socket and the mounting platform having a mating convex under surface, said apparatus comprising:

a clamping bolt having an upper portion secured within the mounting platform and a lower threaded portion;

a clamp surrounding said clamping bolt adapted to clamp the mounting platform to the tripod top; and a handle having a screw threaded small bore adapted to mate with the lower threaded portion of said clamping bolt and a larger bore shaped to accommodate a retaining sleeve, said retaining sleeve being adapted to rotate with said handle and to extend into a clearance bore in said clamp so as to be capable of rotation relative to said clamp but to retain said clamp in location about said clamping bolt when said handle, together with said clamp is removed by unscrewing from said clamping bolt.

2. Apparatus as defined in claim 1 wherein said retaining sleeve is fabricated of aluminum and knurled along that portion thereof which is fitted in said handle larger bore so as to be a press fit therein.

3. Apparatus as defined in claim 2 wherein an anaerobic resin is applied to the knurled portion of said retaining sleeve before pressfitting said sleeve in said handle larger bore.

4. Apparatus as defined in claim 1 wherein said retaining sleeve is an aluminum or plastics tube fastened with adhesive within said handle larger bore and deformed at its upper extremity into a retaining flange to retain said clamp (20) in location relative to said handle.

5. Apparatus as defined in claim 1 wherein said retaining sleeve is formed integrally with said handle and comprises a spigot portion extending from said handle, said spigot being provided with an upper groove and a split ring adapted to reside in said groove for retention of said clamp relative to said handle.

* * * * *